United States Patent [19]

Ishida et al.

[11] Patent Number: 6,070,122
[45] Date of Patent: May 30, 2000

[54] VEHICLE NAVIGATION WITH PRIORITY TARGET DISPLAY

[75] Inventors: Akira Ishida; Kenichiro Yano, both of Kawagoe, Japan

[73] Assignee: Pioneer Electronics Corporation, Tokyo-to, Japan

[21] Appl. No.: 08/848,170

[22] Filed: Apr. 29, 1997

[30] Foreign Application Priority Data

May 2, 1996 [JP] Japan ..................................... 8-111705

[51] Int. Cl.[7] ..................................................... G06F 17/00
[52] U.S. Cl. ............................................ 701/208; 701/209
[58] Field of Search ..................................... 701/200, 207, 701/208, 209, 210, 213, 217; 340/988, 994, 995

[56] References Cited

U.S. PATENT DOCUMENTS

| | | |
|---|---|---|
| 4,761,742 | 8/1988 | Hanabusa et al. . |
| 5,231,584 | 7/1993 | Nimura et al. ........................... 701/209 |
| 5,293,163 | 3/1994 | Kakihara et al. . |

FOREIGN PATENT DOCUMENTS

| | | |
|---|---|---|
| 0 638 887 | 2/1995 | European Pat. Off. . |
| 0 720 003 | 7/1996 | European Pat. Off. . |

*Primary Examiner*—William A. Cuchlinski, Jr.
*Assistant Examiner*—Edward Pipala
*Attorney, Agent, or Firm*—Young & Thompson

[57] ABSTRACT

A target method for use in a navigation system for navigating a movable body is provided with: a selection process of selecting a target attribute which is an attribute of a reach target, to which the movable body is to reach; an extraction process of extracting one of a pularity of reach targets, which has the selected target attribute; and a calculation process of giving a degree of priority to the extracted one of the reach targets in correspondence with a moving condition of the movable body, and of calculating a priority coefficient which indicates the degree of priority for the extracted one of the reach targets. The target searching process is also provided with a display process of displaying the extracted one of the reach targets on the basis of the calculated priority coefficient.

21 Claims, 6 Drawing Sheets

VEHICLE NAVIGATION WITH PRIORITY TARGET DISPLAY

BACKGROUND OF THE INVENTION

1. Field of the Invention

The present invention relates to a target searching method of and a target searching apparatus for providing a user, who is on a movable body moving on a route to a destination set in advance, with positional information related to a reach target on or near the set route to be reached by the movable body.

2. Description of the Related Art

There is a so-called navigation apparatus, which displays a map including a position where a movable body in various kinds such as an automobile, an airplane, a ship etc., is currently located, and further superimposes a position mark indicating a position of the movable body at the currently located position on the displayed map, so as to perform a route guidance or navigation to the destination on the basis of the display. Among the navigation apparatuses, as on-vehicle navigation apparatuses which are mounted on vehicles or auto-mobiles, there is a self-sustained or built-in type navigation apparatus and a GPS (Global Positioning System) type navigation apparatus as rough categories.

The former is a navigation apparatus, which obtains a moving direction and a moving distance of the movable body by use of a speed sensor, an angular speed sensor etc. equipped in or built in the pertinent vehicle, adds them with respect to a standard position so as to calculate the present position, and displays the present position mark and the corresponding map on the display picture plane on the basis of the calculated present position.

On the other hand, the latter is a navigation apparatus, which receives electric waves from a plurality of GPS satellites launched in the space, calculates the present position of the movable body by means of a 3-dimensional measuring method or a 2-dimensional measuring method on the basis of the electric wave reception results, and displays the present position mark and the corresponding map on the display picture plane on the basis of the calculated present position.

Further, there is an on-vehicle navigation apparatus provided with both functions of the above described self-sustained type and GPS type.

According to the above explained navigation apparatus, since the user (e.g. the driver) can grasp the present position of the self vehicle and the map in the vicinity of the present position in association with each other, it is possible to reach a destination without losing his or her way even in an area where the user has never experienced.

Further, the on-vehicle navigation apparatus may have a so-called target searching function. Namely, as the user designates a type or attribute of reach target such as a gasoline station or the like to be reached, the position or positions corresponding to the reach target of the designated type or attribute, which is or are positioned within a predetermined region [e.g., a region which is directed within right and left 45 degrees (90 degrees in total) with respect to the advance direction of the self vehicle at the center thereof and which distance from the self vehicle is within 10 km], is or are superimposed on the map to be displayed.

However, in the above explained target searching function, since the size of the predetermined region and the positional relationship between the predetermined region and the self vehicle are fixed, it may happen a case where an appropriate reach target in line with a moving condition of the self vehicle cannot be searched and displayed depending on the moving condition, which is a problem.

Namely, it is assumed such a case that the self vehicle is executing the above mentioned target searching function while traveling on a highway road, for example. In this case, although it is not possible for the self vehicle to exit from the highway road unless traveling via the interchange, the reach target is displayed which is within the above mentioned predetermined region but cannot be actually reached since it is not on the highway road and since the interchange is not located at the vicinity of the self vehicle, which is the problem.

Further, even while moving on an ordinary road (i.e. a road other than the highway road), it may happen a case that the reach target located on a route, which is too narrow for the vehicle to pass therethrough, is displayed, which is another problem.

SUMMARY OF THE INVENTION

It is therefore an object of the present invention to provide a target searching method and apparatus, which can search and display an appropriate reach target in line with a moving condition of a movable body.

The above object of the present invention can be achieved by a target searching method for use in a navigation system for navigating a movable body. The target searching method is provided with: a selection process of selecting a target attribute which is an attribute of a reach target, to which the movable body is to reach; an extraction process of extracting one of a plurality of reach targets, which has the selected target attribute; a calculation process of giving a degree of priority to the extracted one of the reach targets in correspondence with a moving condition of the movable body, and of calculating a priority coefficient which indicates the degree of priority for the extracted one of the reach targets; and a display process of displaying the extracted one of the reach targets on the basis of the calculated priority coefficient.

According to the target searching method of the present invention, at first, the target attribute is selected by the selection process. Then, one of a plurality of reach targets, which has the selected target attribute, is extracted by the extraction process. Then, the degree of priority is given to the extracted one of the reach targets in correspondence with the moving condition of the movable body, and the priority coefficient is calculated for the extracted one of the reach targets, by the calculation process. Finally, the extracted one of the reach targets is displayed on the basis of the calculated priority coefficient, by the display process. Accordingly, it is possible to display the reach target in the order of the priority in correspondence with the moving condition of the movable body.

In this manner, it is possible to display the appropriate reach target in consideration of the moving condition of the movable body according to the target searching method of the present invention.

In one aspect of the target searching method of the present invention, the calculation process calculates the priority coefficient by use of at least one of an advance direction and a speed of the movable body.

According to this aspect, the priority coefficient is calculated by use of the advance direction and/or the speed of the movable body. Thus, by lowering the degree of priority of the reach target located in the direction opposite to the advance direction etc. so as to reduce the chance of displaying such a reach target, it is possible to display only the appropriate reach target in consideration of the moving condition of the self vehicle.

In another aspect of the target searching method of the present invention, in case that the movable body is traveling on a highway road, the calculation process gives the degree of priority to the extracted one of the reach targets such that, as the extracted one of the reach targets is located the closer to an interchange to exit thereat from the highway road, the degree of priority becomes the higher.

According to this aspect, in case that the movable body is traveling on the highway road, as the extracted one of the reach targets is located the closer to the interchange, the degree of priority becomes the higher. Thus, it is possible to display only the appropriate reach target in correspondence with the movable body traveling on the highway road.

In another aspect of the target searching method of the present invention, the calculation process calculates the priority coefficient by use of at least one of a road width, a road distance and a road inclination of a route where the movable body is to travel.

According to this aspect, the priority coefficient is calculated by use of the road width, the road distance and/or the road inclination of the route where the movable body is to travel. Thus, it is possible to display only the appropriate reach target in consideration of the route where the movable body is scheduled to travel.

In another aspect of the target searching method of the present invention, the extraction process extracts a plurality of the reach targets, each of which has the selected target attribute. The calculation process gives the degree of priority to each of the extracted reach targets, and calculates the priority coefficient for each of the extracted reach targets. And that, the display process selects a predetermined number of reach targets among the extracted reach targets in an order from the higher degree of priority on the basis of the calculated priority coefficient, and displays the selected predetermined number of reach targets simultaneously on a map.

According to this aspect, when the target attribute is selected by the selection process, a plurality of the reach targets, each of which has the selected target attribute, is extracted by the extraction process. Then, the degree of priority is given to each of the extracted reach targets, and the priority coefficient is calculated for each of the extracted reach targets, by the calculation process. Finally, a predetermined number of reach targets is or are selected among the extracted reach targets in the order from the higher degree of priority, and the selected predetermined number of reach targets is or are simultaneously displayed on a map, by the display process. Thus, one or a plurality of reach targets are certainly displayed in the order of the priority in correspondence with the moving condition of the movable body.

The above mentioned object of the present invention can be also achieved by a target searching apparatus for use in a navigation system for navigating a movable body. The target searching apparatus is provided with: a selection device for selecting a target attribute which is an attribute of a reach target, to which the movable body is to reach; an extraction device for extracting one of a plurality of reach targets, which has the selected target attribute; a calculation device for giving a degree of priority to the extracted one of the reach targets in correspondence with a moving condition of the movable body, and for calculating a priority coefficient which indicates the degree of priority for the extracted one of the reach targets; and a display device for displaying the extracted one of the reach targets on the basis of the calculated priority coefficient.

According to the target searching apparatus of the present invention, at first, the target attribute is selected by the selection device. Then, one of a plurality of reach targets, which has the selected target attribute, is extracted by the extraction device. Then, the degree of priority is given to the extracted one of the reach targets in correspondence with the moving condition of the movable body, and the priority coefficient is calculated for the extracted one of the reach targets, by the calculation device. Finally, the extracted one of the reach targets is displayed on the basis of the calculated priority coefficient, by the display device. Accordingly, it is possible to display the reach target in the order of the priority in correspondence with the moving condition of the movable body.

In this manner, it is possible to display the appropriate reach target in consideration of the moving condition of the movable body according to the target searching apparatus of the present invention.

In one aspect of the target searching apparatus of the present invention, the calculation device calculates the priority coefficient by use of at least one of an advance direction and a speed of the movable body.

According to this aspect, the priority coefficient is calculated by use of the advance direction and/or the speed of the movable body. Thus, by lowering the degree of priority of the reach target located in the direction opposite to the advance direction etc. so as to reduce the chance of displaying such a reach target, it is possible to display only the appropriate reach target in consideration of the moving condition of the self vehicle.

In another aspect of the target searching apparatus of the present invention, in case that the movable body is traveling on a highway road, the calculation device gives the degree of priority to the extracted one of the reach targets such that, as the extracted one of the reach targets is located the closer to an interchange to exit thereat from the highway road, the degree of priority becomes the higher.

According to this aspect, in case that the movable body is traveling on the highway road, as the extracted one of the reach targets is located the closer to the interchange, the degree of priority becomes the higher. Thus, it is possible to display only the appropriate reach target in correspondence with the movable body traveling on the highway road.

In another aspect of the target searching apparatus of the present invention, the calculation device calculates the priority coefficient by use of at least one of a road width, a road distance and a road inclination of a route where the movable body is to travel.

According to this aspect, the priority coefficient is calculated by use of the road width, the road distance and/or the road inclination of the route where the movable body is to travel. Thus, it is possible to display only the appropriate reach target in consideration of the route where the movable body is scheduled to travel.

In another aspect of the target searching apparatus of the present invention, the extraction device extracts a plurality of the reach targets, each of which has the selected target attribute. The calculation device gives the degree of priority to each of the extracted reach targets, and calculates the priority coefficient for each of the extracted reach targets. And that, the display device selects a predetermined number of reach targets among the extracted reach targets in an order from the higher degree of priority on the basis of the calculated priority coefficient, and displays the selected predetermined number of reach targets simultaneously on a map.

According to this aspect, when the target attribute is selected by the selection device, a plurality of the reach targets, each of which has the selected target attribute, is extracted by the extraction device. Then, the degree of priority is given to each of the extracted reach targets, and the priority coefficient is calculated for each of the extracted reach targets, by the calculation device. Finally, a predetermined number of reach targets is or are selected among the extracted reach targets in the order from the higher degree of priority, and the selected predetermined number of reach targets is or are simultaneously displayed on a map, by the display device. Thus, one or a plurality of reach targets are certainly displayed in the order of the priority in correspondence with the moving condition of the movable body.

The above object of the present invention can be also achieved by a program storage device readable by a route searching apparatus for use in a navigation system for navigating a movable body, tangibly embodying a program of instructions executable by the route searching apparatus to perform method processes for searching and displaying a desirable reach target. The method processes are provided with: a selection process of selecting a target attribute which is an attribute of a reach target, to which the movable body is to reach; an extraction process of extracting one of a plurality of reach targets, which has the selected target attribute; a calculation process of giving a degree of priority to the extracted one of the reach targets in correspondence with a moving condition of the movable body, and of calculating a priority coefficient which indicates the degree of priority for the extracted one of the reach targets; and a display process of displaying the extracted one of the reach targets on the basis of the calculated priority coefficient.

According to the program storage device, such as a CD-ROM, a ROM, a floppy disk or the like, of the present invention, the above described route searching method of the present invention can be performed as the route searching apparatus reads and executes the program of instructions.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. In the embodiment explained below, the explanation is made as for a case where the present invention is applied to an on-vehicle navigation apparatus for a vehicle or auto-mobile.

(I) CONSTRUCTION OF APPARATUS

At first, a whole construction of the on-vehicle navigation apparatus as the embodiment of the present invention is explained with reference to FIG. 1.

Figure 1:
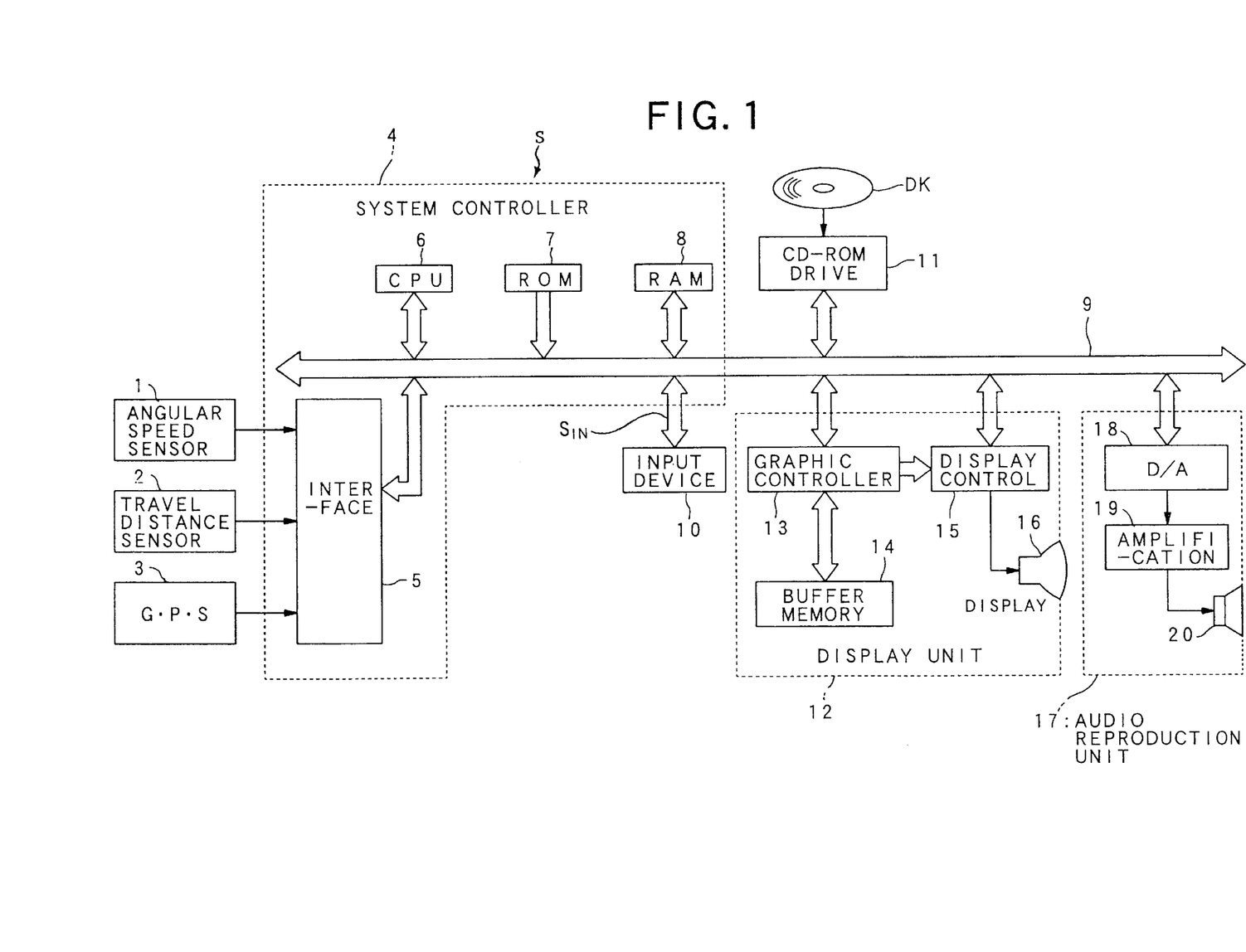
FIG. 1 is a block diagram of a navigation apparatus for use in embodiments of the present invention.

In FIG. 1, an on-vehicle navigation apparatus S is provided with: an angular speed sensor 1 for detecting an angular speed of a self vehicle at a time of turning or rotating, and outputting an angular speed data and a relative azimuth data; a travel distance sensor 2 for calculating the number of pulses per one rotation of a drive shaft by counting the number of pulses of a pulse signal having a predetermined cycle accompanying the rotation of the drive shaft, and for outputting travel distance data based on the number of pulses per one rotation of the drive shaft; a GPS receiver 3 for receiving electric waves from GPS satellites to output GPS measurement data, and for outputting absolute azimuth data of the advance direction of the self vehicle; a system controller 4 for performing an overall control of the navigation apparatus S on the basis of the relative azimuth data, the angular speed data, the travel distance data, the GPS measurement data and the absolute azimuth data; an input device 10 for inputting various data, such as an operation panel, a remote-control device or the like; a CD-ROM (Compact Disk-Read Only Memory) drive 11 for reading and outputting various data, such as map data including road data, which indicates the number of lanes, the width of the road etc., and control programs corresponding to respective embodiments described later from a CD-ROM disk DK, under the control of the system controller 4; a display unit 12 for displaying various display data under the control of the system controller 4; and an audio reproduction unit 17 for reproducing and outputting various audio data under the control of the system controller 4.

The system controller 4 is provided with: an interface portion 5 for executing an interface operation with external sensors e.g. the angular speed sensor 1, the travel distance sensor 2 and the GPS receiver 3; a CPU 6 for controlling the whole portion of the system controller 4; a ROM (Read Only Memory) 7 for storing a control program etc. to control the system controller 4; and a RAM (Random Access Memory) 8 having a non-volatile type memory for storing various data such as the route data set in advance by the user through the input device 10, in the random accessing manner. The input device 10, the CD-ROM drive 11, the display unit 12 and the audio reproduction unit reference 17 are all connected with the system controller 4 via a bus line 9.

The display unit 12 is provided with: a graphic controller 13 for performing an overall control of the display unit 12 on the basis of a control data transmitted from the CPU 6 through the bus line 9; a buffer memory 14 having a VRAM (Video RAM) etc., for temporarily storing the image information ready to be displayed; and a display control unit 15 for controlling a display 16 such as the LCD device, the CRT display device or the like, on the basis of the image data outputted from the graphic controller 13.

The audio reproduction unit 17 is provided with a D/A (Digital to Analog) converter 18 for performing a D/A conversion of audio digital data transmitted from the CD-ROM drive 11 or the RAM 8 through the bus line 9; an amplifier 19 for amplifying an audio analog signal from the D/A converter 18; and a speaker 20 for converting the amplified audio analog signal to the audio sound, and for outputting it to the external.

In a target searching process described later, when the kind of the reach target to be displayed is inputted at the input device 10, a selection signal $S_{IN}$, which includes the information indicating the kind of the reach target to be displayed, is inputted to the CPU 6 through the bus line 9 from the input device 10.

Nextly, the target searching process of the on-vehicle navigation apparatus S of the present embodiment will be explained with reference to FIGS. 2 to 6.

The target searching process indicated by the flow charts in the embodiments hereinbelow is mainly performed by the CPU 6, and is performed on the basis of the input signal at the input device 10 as one part of the main navigation program to perform the navigation operation by controlling the whole portion of the on-vehicle navigation apparatus S.

The program corresponding to the flow chart of each embodiment described below is stored in the CD-ROM disk DK as the control program in advance, and is read out therefrom through the CD-ROM drive 11 as the occasion demands.

In the present embodiment, the CD-ROM disk DK as one example of a program storage device, tangibly embodies a program of instructions executable by the system controller 4 to perform method processes for searching and displaying a reach target as explained in detail with reference to the flow charts of FIGS. 2, 4 and 5. The program read by the CD-ROM drive 11 may be stored in the RAM 8, so as to speedily execute the program. Alternatively, the program may be stored in a ROM 7 in advance, or may be received through a wire or wireless communication line by use of a modem and stored into the RAM 8.

(II) OPERATION FOR PERFORMING TARGET SEARCHING PROCESS

Figure 6:
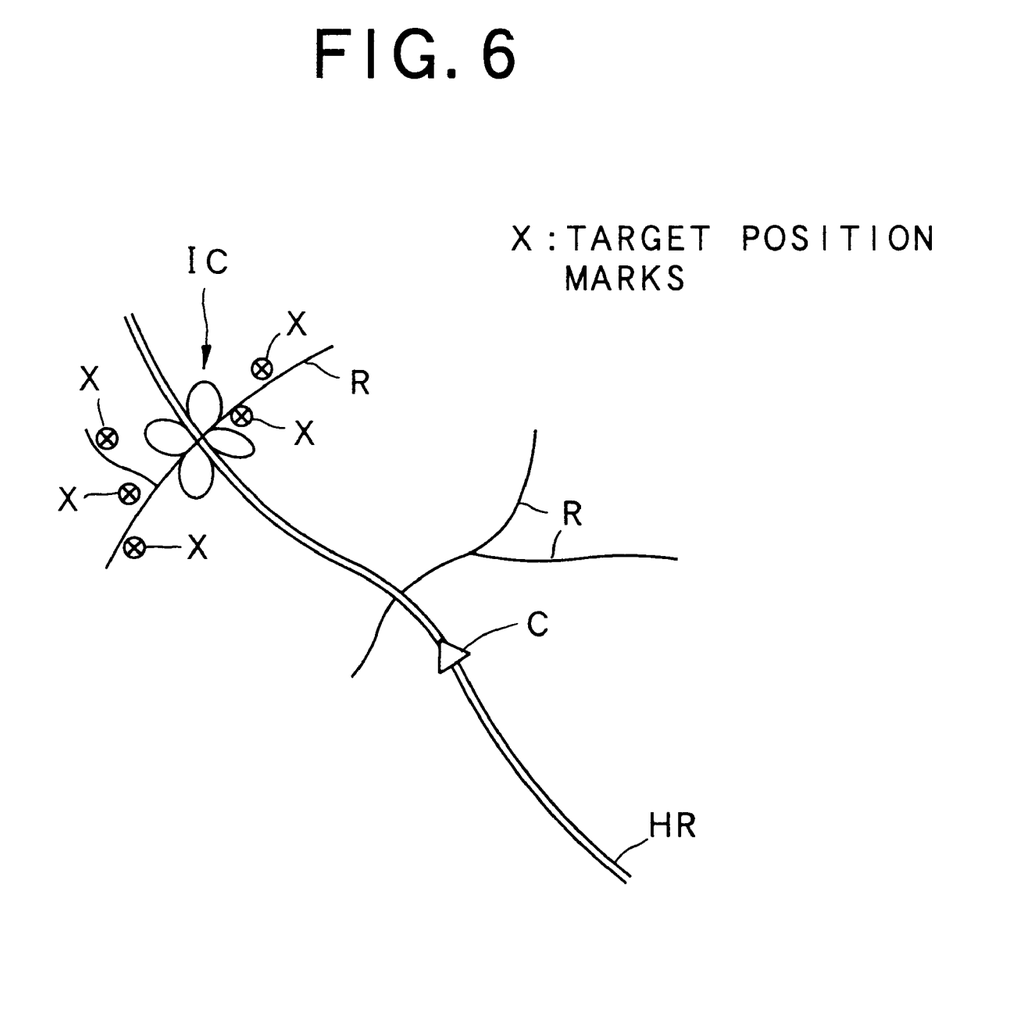
FIG. 6 is a diagram indicating one example of a display result of the target searching process of the embodiment.

Nextly, the operation for performing the target searching process in the embodiments will be explained with reference to FIGS. 2, 3 and 6. In the embodiments explained below, a parameter called as a "cost" is employed as a priority coefficient to indicate the degree of priority for the display which is given to each reach target to be searched and displayed. This cost is a parameter which value is decreased as the degree of priority for the display is increased. For example, the cost given to one reach target, which is located in the direction reverse to the advance direction of the self vehicle, is higher than that that given to another reach target, which is located forward with respect to the advance direction. The cost given to one reach target, which is located on one side of the road able to access from the lane where the self vehicle travels, is lower than that given to another reach target, which is located on the opposite side of the same road.

At first, the whole target searching process of the present embodiment is explained with reference to a flow chart of FIG. 2.

Figure 2:
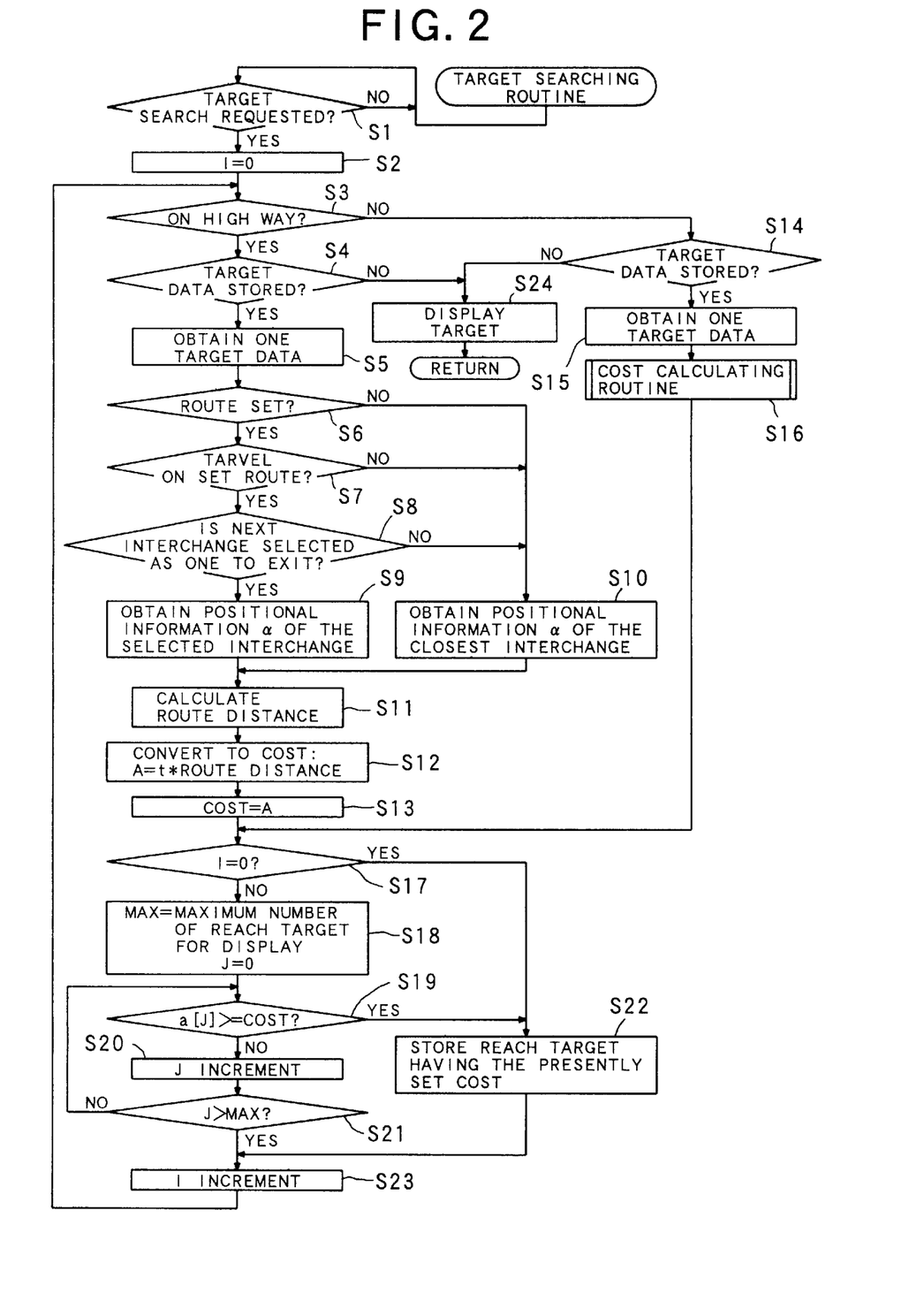
FIG. 2 is a flow chart showing a target searching process in the embodiments.
Figure 3:
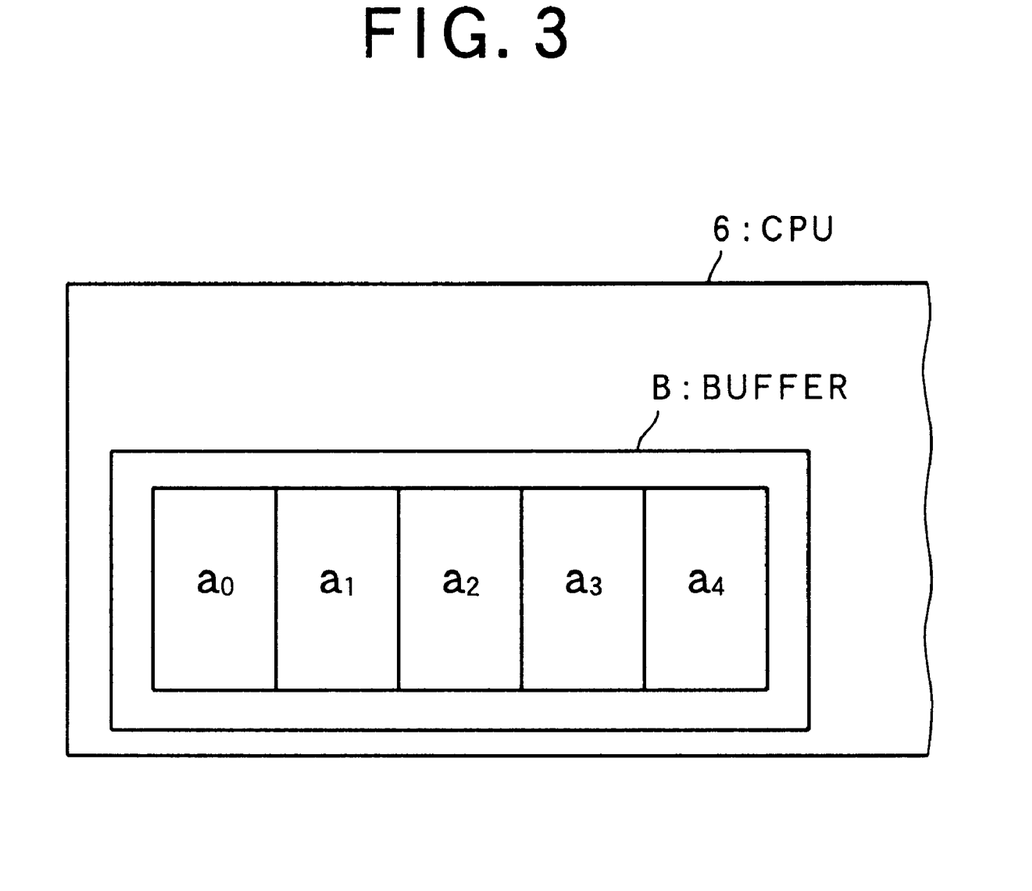
FIG. 3 is a diagram showing a structure in a buffer used for the embodiments.

As shown in FIG. 2, in the target searching process of the present embodiment, at first, it is judged whether or not an input signal indicating a request for the target searching process is inputted from the input device 10 together with the selection signal $S_{IN}$, which indicates the kind or attribute of reach target to be searched and displayed (e.g., a "gasoline stand (gas-station)", a "restaurant", a "service area" and the like) (step S1). If it is not inputted (step S1: NO), the input signal is waited for as it is. If it is inputted (step S1: YES), a parameter I indicating the number of searched reach targets (i.e. the total number of searching processes which have been performed) is initialized to be "0" (step S2).

When the initialization of the parameter I is completed (step S2), it is judged whether or not the self vehicle is presently positioned on a highway road (step S3). The judgment at the step S3 is performed on the basis of the result of a so-called map matching process. This map matching process is such a process that, in case that the present position of the self vehicle measured on the basis of the aforementioned GPS measurement data or measured in the aforementioned self-sustained manner is indicated at a position which is not located on any road due to the measurement error etc. even if the self vehicle is actually traveling on a certain road, a perpendicular line is drawn to one road on the map which is the closest to the measured present position, so that the tip of the drawn perpendicular line (positioned on the road) is displayed as the present position of the self vehicle. Accordingly, the present position is matched with the road on the displayed map.

By the judgment at the step S3, if the self vehicle is judged to be positioned on the highway road according to the result of the map matching process (step S3: YES), it is judged whether or not a reach target, which corresponds to the kind of reach target to be searched and reached and is indicated by the selection signal $S_{IN}$, is stored in the CD-ROM disk DK or the RAM 8 (step S4). Then, if the reach target is stored in the CD-ROM disk DK or the RAM 8 (step S4: YES), one reach target among the stored reach targets is obtained from the CD-ROM disk DK or the RAM 8 (step S5). Then, it is judged whether or not the route is set in advance from the original departure point to the final destination point of the self vehicle (step S6).

By the judgment at the step S6, if the route is not set in advance (step S6: NO), the positional information α related to an interchange, which is the closest among the interchanges located forward of the self vehicle on the highway road where the self vehicle is presently traveling, is obtained from the CD-ROM disk DK (step S10), and the operation flow proceeds to a step S11. In the positional information α obtained at the step S10, the positional information expressed by the latitude and the longitude of the location of the pertinent interchange etc. is included.

On the other hand, by the judgment at the step S6, if the route is set in advance (step S6: YES), it is judged whether or not the self vehicle is presently traveling on the set route (step S7). Then, if it is not traveling on the set route (step S7: NO), the operation flow branches to the step S10. If it is presently traveling on the set route (step 7: YES), it is judged whether or not an interchange located forward of the self vehicle on the highway road where the self vehicle is presently traveling is selected as the interchange in the set route at which the self vehicle is to exit from the highway road (step S8). If it is not selected (step S8: NO), the operation flow branches to the step S10. On the other hand, if it is selected (step S8: YES), the positional information α related to the selected interchange is obtained from the CD-ROM disk DK (step S9). Then, on the basis of this obtained positional information α and the data of one reach target obtained at the step S5, a route distance to the reach target obtained at the step S5 from the interchange is calculated as a parameter (Step S11). Here, the "route distance" in the process of FIG. 2 is not a parameter merely determined by the distance, but a parameter synthetically calculated in consideration of, for example, a road width, an inclination (or a difference in elevation), a road condition etc. of the road from the interchange to the reach target obtained at the step S5.

When the route distance is calculated at the step S11, by multiplying it by a coefficient t to convert the calculated route distance to a cost, a cost A corresponding to the route distance from the interchange to the reach target obtained at the step S5 is calculated (step S12). Then, a parameter Cost indicating the cost is set to the calculated cost A (step S13). Here, the coefficient t to convert the route distance to the cost is set in consideration of a road width, a traffic regulation (e.g. one way traffic regulation), a road type, the degree of traffic jam (which may be calculated by use of the information from the CD-ROM disk DK or the external information such as the VICS (Vehicle Information Communication System) information recently put into practice), time information (e.g. information related to the time of starting the target searching process, the information as for time peculiar to the search target) and so on.

On the other hand, by the judgment at the step S3, if the self vehicle does not exist on the highway road according to the result of the map matching process (step S3: NO), it is judged whether or not the reach target corresponding to the kind of reach target to be searched and displayed, which is indicated by the selection signal $S_{IN}$, is stored in the CD-ROM disk DK or the RAM 8 (step S14). Then, if it is stored (step S14: YES), among the pertinent reach targets, the data of one reach target is obtained from the CD-ROM disk DK or the RAM 8 (step S15). Then, the cost corresponding to the obtained one reach target is calculated (step S16), and the operation flow proceeds to a step S17 while substituting the parameter Cost by the calculation result of the step S16. The cost calculating routine at the step S16 will be described later in detail.

When the cost is set at the step S13 or S16, then, it is judged whether or not the parameter I is equal to "0" (step S17). Since the parameter I is equal to "0" at the present time (refer to step S2) (step S17: YES), the reach target obtained at the step S5 or S15 is stored as a display candidacy of reach target to be displayed into a buffer B included in the CPU 6 (step S22). As shown in FIG. 3, 5 areas i.e. storage areas $a_0$ to $a_4$ are included in the buffer B, and the data of each reach target is stored in respective one of these storage areas $a_0$ to $a_4$. In FIG. 2 again, at the step S22, the data of the reach target obtained at the step S5 or S15 is stored into the storage area $a_0$. Then, the parameter I is incremented by one (step S23), and the operation flow returns to the step S3 so as to search the next reach target.

Nextly, the operations from the steps S3 and S4 to S13 or the steps S3 and S14 to S16 are repeated. At this time, at the step S5 or S15, in case that the parameter I is "0", a reach target other than the reach target to which the operation from the steps S3 to S13 or the steps S14 to S16 have been applied, is newly selected, so that the process from the steps S6 to S13 or the step S16 is applied to this newly selected reach target.

Then, when the cost is calculated for this newly selected reach target (step S13 or S16), it is judged whether or not the parameter I is equal to "0". At the present time, since the parameter I is "1", the judgment result at the step S17 is "NO". Then, a parameter MAX which indicates the maximum number of the reach targets to be simultaneously displayed is set to the maximum number of the reach target candidacies able to be displayed, and a parameter J indicating the serial number of the storage area (0 to 4) in the buffer B is set to "0" (step S18). In the present embodiment, the maximum number of the reach targets to be simultaneously displayed is prescribed to be "5", and, in accordance with this number, the storage areas $a_0$ to $a_4$ are provided in the buffer B.

Then, the cost (Cost) set at the step S13 or S16 at the present time (corresponding to the parameter I="1") is compared with the cost (a[J]) of the data of the reach target presently stored in the buffer B (at the storage area $a_0$) (step S19). By the judgment at the step S19, if the cost (Cost) presently set is not greater than the cost (a[J]) (step S19: YES), the data of the reach target having the cost presently set is stored into the buffer B (step S22), and the parameter I is incremented by one (step S23). At this time, the data of the reach target having the presently set cost is stored into the storage area $a_0$ instead of the data of the reach target having the previously set cost, and the data of the reach target having the previously set cost is moved from the storage area $a_0$ to the storage area $a_1$ to be stored therein.

Here, in each of the storage areas $a_0$ to $a_4$ in the buffer B, the maximum number among values which can be adopted as the cost (e.g., [FFh] (h indicates the hexadecimal number)) is stored in case that no data of the reach target is stored therein.

On the other hand, if the presently set cost (a[J]) is greater than the previously set cost (Cost) i.e. the cost of the data of the reach target presently stored in the storage area $a_0$ in the buffer B (step S19; NO), the parameter J is incremented by one (step S20). Then, the parameter MAX and the incremented parameter J are compared with each other (step S21). At the present time, since the parameter MAX is "5" and the parameter J is "1", the judgment result at the step S21 is "NO", so that the operation flow returns to the step S19. Then, the cost presently set and the cost of the data of the reach target presently stored in the storage area $a_1$ in the buffer B are compared with each other (step S19). At the present time, since the data corresponding to the maximum cost (e.g. [FFh]) is stored in the storage area $a_1$ in the buffer B, the judgment result of the step S19 is "YES", so that the data of the reach target having the presently set cost is stored into the storage area $a_1$ in the buffer B (step S22), and the parameter I is incremented by one (step S23).

Namely, the processes from the steps 17 to S21 are to store the data in such an order that the data of the reach target which cost is the lowest in the buffer B is stored in the storage area $a_0$ and that the data of the reach target which cost is the highest in the buffer B is stored in the storage area $a_4$. Namely, these processes are to always keep a relationship expressed by a following expression (1) in case that the costs of the reach targets stored in the respective storage areas are compared with each other.

$$\text{the cost of the data in the storage area } a_0 < \text{the cost of the data in the storage area } a_1 < \text{the cost of the data in the storage area } a_2 < \text{the cost of the data in the storage area } a_3 < \text{the cost of data in the storage area } a_4 \quad (1)$$

Therefore, for example, if the cost corresponding to a reach target is newly set in a condition where the data of the reach targets are stored in all of the storage areas $a_0$ to $a_4$ while keeping the relationship expressed by the expression (1) (step S13 or S16), since the parameter I is not "0" the judgment result at the step S17 is "NO", and the parameter MAX is set again and the parameter J is initialized again (step S18). Then, the cost corresponding to the new reach target is compared with the costs of the data of the reach targets stored in the buffer B one after another (step S19). Then, among the data of the reach targets which are already stored in the two consecutive storage areas in the buffer B, the data of the new reach target is inserted and stored into the storage area between the data of the reach target having the cost which is smaller than the cost of the new reach target and the data of the reach target having the cost which is greater than the cost of the new reach target. At this time, the data of the reach target which has been stored in the storage area $a_4$ is erased, so that the relationship expressed by the expression (1) is always maintained. Then, when the parameter J becomes greater than the parameter MAX (step S21: YES), the parameter I is incremented by one (step S23), and the operation flow returns to the step S3 again.

After that, the processes from the steps S3 to S23 are performed with respect to all of the reach targets corresponding to the kinds indicated by the selection signal $S_{IN}$ in the CD-ROM disk DK or the RAM 8. Then, when the processes with respect to all of the reach targets are completed i.e., there are no more data of reach target left to be searched (step S4: NO or step S14: NO), the reach targets which data are stored in the buffer B are superimposed on their peripheral map displayed on the display 16 (step S24). Finally, the operation flow returns to the main navigation program.

Here, one display example of the result of the above described processes shown in FIG. 2 is explained with reference to FIG. 6. In case that the self vehicle is traveling on a highway road HR (at a position indicated by a self vehicle mark C), the cost is calculated in consideration of the route distance from an interchange IC to exit from the highway road HR to each reach target. Then, 5 reach targets in the order from the lower calculated cost to the higher calculated cost are displayed by respective target position marks X at the vicinity of an ordinary road R near the interchange IC.

Nextly, the cost calculating routine at the step S16 in FIG. 2 is explained with reference to FIGS. 4 and 5.

At first, a first embodiment of the cost calculating routine is explained with reference to FIG. 4.

Figure 4:
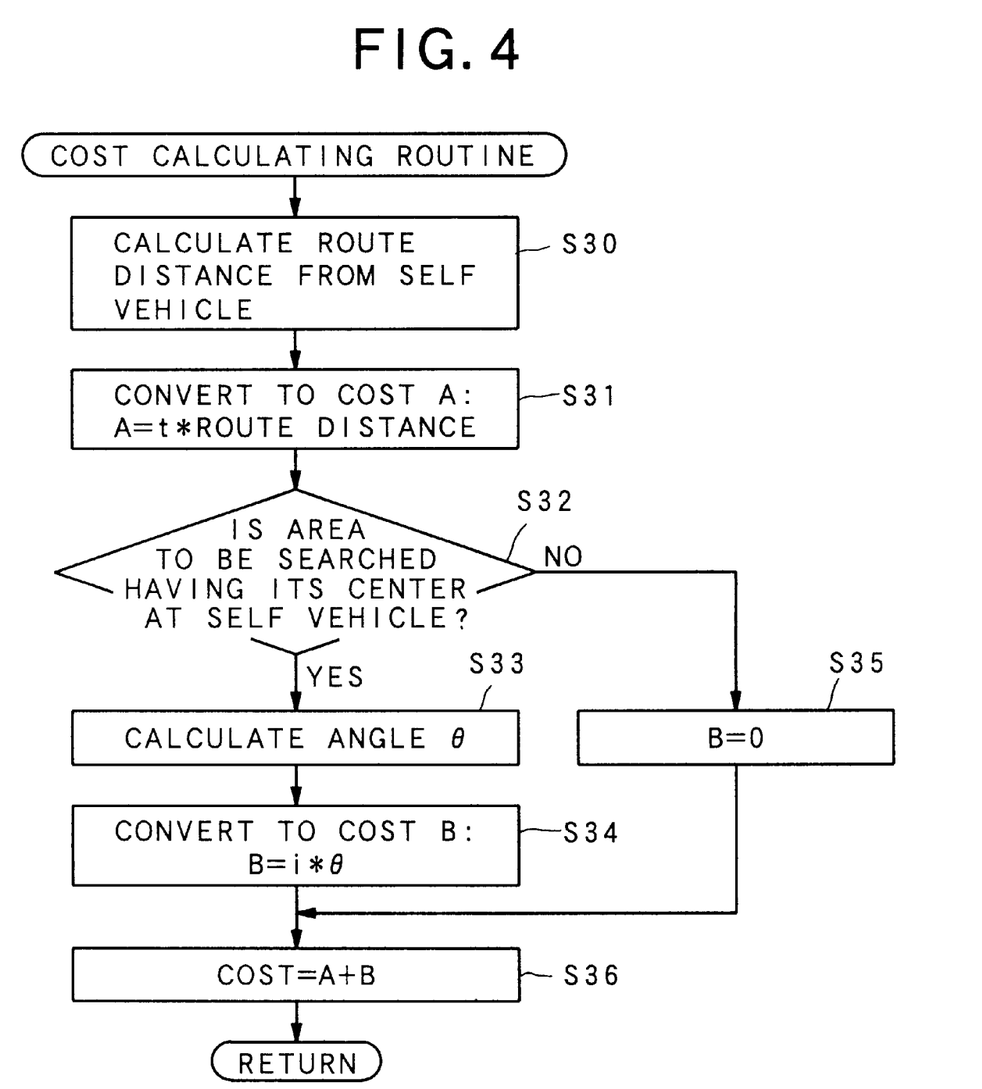
FIG. 4 is a flow chart showing a cost calculating routine in the first embodiment.

The first embodiment of the cost calculating routine shown in FIG. 4 is a process for calculating the cost by use of the route distance and the azimuth only.

In the first embodiment of the cost calculating routine shown in FIG. 4, when the data of one reach target is obtained from the CD-ROM disk DK or the RAM 8 (step S15 in FIG. 2), the above mentioned route distance (refer to the step S11 in FIG. 2) from the present position of the self vehicle to the reach target obtained at the step S15 is calculated (step S30). Then, the route distance is multiplied by the coefficient t to convert it to the cost, so that the cost A corresponding to the route distance from the present position of the self vehicle to the reach target obtained at the step S15 is calculated (step S31).

Next, it is judged whether the area in which the reach target to be reached exists is an area having its center at the present position of the self vehicle or a desirable area having no relationship with the present position of the self vehicle (step S32). If the area having no relationship with the present position of the self vehicle is to be searched (step S32: NO), a cost B corresponding to the angle from the present position of the self vehicle to the reach target is set to "0" (step S35), and the operation flow is proceeded to a step S36.

On the other hand, by the judgment at the step S32, if the area is the area having its center at the present position of the self vehicle (step S32: YES), an angle θ between the advance direction of the self vehicle and the line, which is drawn from the present position of the self vehicle to the reach target, is calculated (step S33). Then, by multiplying the calculated angle θ by a coefficient i to convert the angle θ to the cost, the cost B corresponding to the angle θ of the advance direction of the self vehicle with respect to the reach target obtained at the step S15 is calculated (step S34).

Finally, the cost A calculated at the step S31 and the cost B calculated at the step S34 are added together, and this calculation result is substituted for the parameter Cost (step S36). Then, the operation is proceeded to the step S17 in FIG. 2.

Nextly, a second embodiment of the cost calculating routine is explained with reference to FIG. 5.

Figure 5:
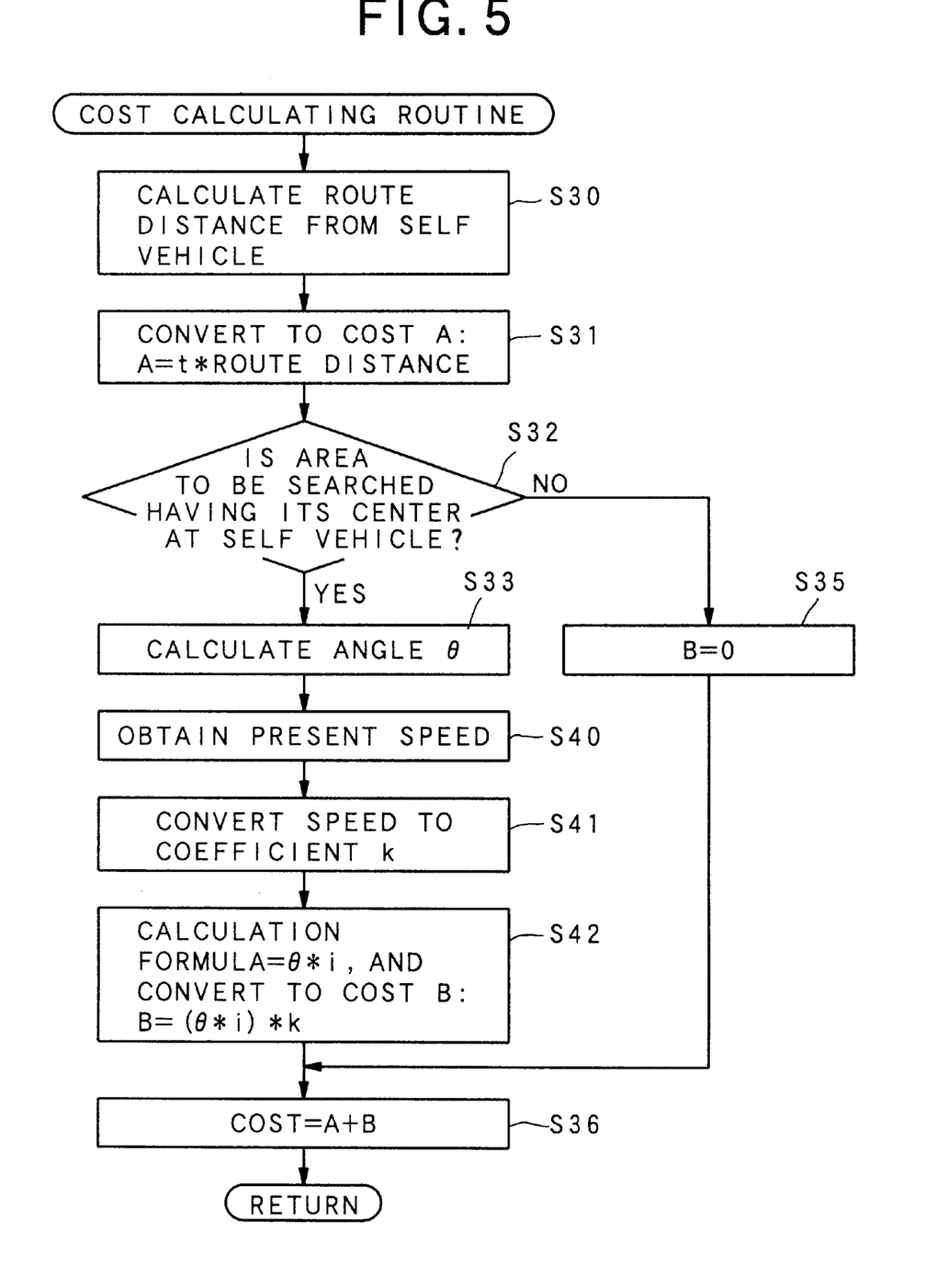
FIG. 5 is a flow chart showing a cost calculating routine in the second embodiment.

The second embodiment of the cost calculating routine shown in FIG. 5 is a process to calculate the cost by use of a moving speed of the self vehicle in addition to the route distance and the azimuth. In FIG. 5, the same steps as those in FIG. 4 carry the same reference numerals and the detailed explanations are omitted.

In the second embodiment of the cost calculating routine shown in FIG. 5, at first, the processes at the steps S30 to S33 shown in FIG. 4 are performed.

Then, the speed of the self vehicle is calculated on the basis of the GPS measurement data or the distance data obtained from the travel distance sensor 2 (step S40). Then, the calculated speed is converted to a coefficient k, and this coefficient k is set as the coefficient in the calculation formula to calculate the cost B from the angle θ (step S41).

Nextly, by multiplying the angle θ calculated at the step S33 by the above mentioned coefficient i, the cost corresponding to the angle θ of the advance direction of the self vehicle with respect to the reach target obtained at the step S15 is calculated, and the cost B is calculated by multiplying this calculated cost by the above mentioned coefficient k (i.e. the cost B =((angle θ×i)×k)) (step S42).

Finally, the cost A calculated at the step S31 and the cost B calculated at the step S42 are added together, and this calculation result is substituted for the parameter Cost (step S36). Then, the operation flow is proceeded to the step S17 in FIG. 2.

As described above in detail, according to the target searching process of the present embodiment, the degree of priority for display is given to each reach target to be displayed in correspondence with the moving condition of the self vehicle with respect to the each reach target, the cost is calculated as for each reach target in correspondence with the respective degree of priority, and the reach targets are displayed on the basis of the calculated costs. Accordingly, it is possible to display the reach targets in the order of the priority in consideration of the moving condition of the self vehicle.

Further, in case that the cost is calculated by use of one or both of the advance direction and the speed of the self vehicle, by decreasing the degree of priority of the reach target which is located in the direction opposite to the advance direction or the like so as to reduce the chance of displaying the pertinent reach target, it is possible to display only the appropriate reach targets in consideration of the moving condition of the self vehicle.

Furthermore, when the self vehicle is traveling on the highway road, since the cost is calculated by giving a reach target, which is located at the vicinity of the interchange to exit from the highway road, the higher degree of priority than another reach target, which is located far from the interchange, it is possible to display only the appropriate reach targets in correspondence with the self vehicle traveling on the highway road.

Furthermore, since the cost is calculated by use of the road width, the road distance, the inclination and the like of the route for the self vehicle to travel, it is possible to display only the appropriate reach targets in correspondence with the route scheduled to be traveled.

Although the case where the movable body is the vehicle or auto-mobile is explained in the above embodiment, the present invention is not limited to this. Instead, the present invention can be adapted for other types of movable bodies such as an auto-cycle, auto-tricycle and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A target searching method for use in a navigation system for navigating a movable body, said target searching method comprising:

a selection process of selecting a target attribute which is an attribute of a reach target, to which said movable an extraction process of extracting M of a plurality of reach targets, where M is a natural number greater than or equal to 2, each of the M reach targets having the selected target attribute;

a calculation process of giving a degree of priority to each of said extracted M reach targets in correspondence with a moving condition of said movable body, and of calculating a priority coefficient which indicates the degree of priority for each of said extracted M reach targets; and a display process of displaying one or N reach target or targets, where N is a natural number less than M, among said extracted M reach targets on the basis of the calculated priority coefficient.

2. A target searching method according to claim 1, wherein said calculation process calculates the priority coefficient by use of at least one of an advance direction and a speed of said movable body.

3. A target searching method according to claim 1, wherein, in case that said movable body is traveling on a highway road, said calculation process gives the degree of priority to said extracted one of said reach targets such that, as said extracted one of said reach targets is located the closer to an interchange to exit thereat from said highway road, the degree of priority becomes the higher.

4. A target searching method according to claim 1, wherein said calculation process calculates the priority coefficient by use of at least one of a road width, a road distance and a road inclination of a route where said movable body is to travel.

5. A target searching method according to claim 1, wherein said display process selects said N reach targets in an order from the higher degree of priority on the basis of the calculated priority coefficient, and displays said selected N reach targets simultaneously on a map.

6. A target searching method according to claim 1, wherein said calculation process gives the degree of priority to said extracted M reach targets in correspondence with a road, on which said movable body is travelling, as the moving condition of said movable body.

7. A target searching method according to claim 1, wherein said calculation process gives the degree of priority to said extracted M reach targets in correspondence with a current position of said movable body, as the moving condition of said movable body.

8. A target searching apparatus for use in a navigation system for navigating a movable body, said target searching apparatus comprising:

a selection means for selecting a target attribute which is an attribute of a reach target, to which said movable body is to reach;

an extraction means for extracting M of a plurality of reach targets, where M is a natural number greater or equal to 2, each of the M reach targets having the selected target attribute;

a calculation means for giving a degree of priority to each of said extracted M reach targets in correspondence with a moving condition of said movable body, and for calculating a priority coefficient which indicates the degree of priority for each of said extracted M reach targets; and a display means for displaying one or N reach target or targets, where N is a natural number less than M, among said extracted M reach targets on the basis of the calculated priority coefficient.

9. A target searching apparatus according to claim 8, wherein said calculation means calculates the priority coefficient by use of at least one of an advance direction and a speed of said movable body.

10. A target searching apparatus according to claim 8, wherein, in case that said movable body is traveling on a highway road, said calculation means gives the degree of priority to said extracted one of said reach targets such that, as said extracted one of said reach targets is located the closer to an interchange to exit thereat from said highway road, the degree of priority becomes the higher.

11. A target searching apparatus according to claim 8, wherein said calculation means calculates the priority coefficient by use of at least one of a road width, a road distance and a road inclination of a route where said movable body is to travel.

12. A target searching apparatus according to claim 8, wherein said display means selects said N reach targets in an order from the higher degree of priority on the basis of the calculated priority coefficient, and displays said selected N reach targets simultaneously on a map.

13. A target searching apparatus according to claim 8, wherein said calculation means gives the degree of priority to said extracted M reach targets in correspondence with a road, on which said movable body is travelling, as the moving condition of said movable body.

14. A target searching apparatus according to claim 8, wherein said calculation means gives the degree of priority to said extracted M reach targets in correspondence with a current position of said movable body, as the moving condition of said movable body.

15. A program storage device readable by a route searching apparatus for use in a navigation system for navigating a movable body, tangibly embodying a program of instructions executable by said route searching apparatus to perform method processes for searching and displaying a desirable reach target, said method processes comprising:

a selection process of selecting a target attribute which is an attribute of a reach target, to which said movable body is to reach;

an extraction process of extracting M of a plurality of reach targets, where M is a natural number greater or equal to 2, each of the M reach targets having the selected target attribute;

a calculation process of giving a degree of priority to each of said extracted M reach targets in correspondence with a moving condition of said movable body, and of calculating a priority coefficient which indicates the degree of priority for each of said extracted M reach targets; and a display process of displaying one or N reach target or targets, where N is a natural number less than M, among said extracted M reach targets on the basis of the calculated priority coefficient.

16. A program storage device according to claim 15, wherein said calculation process calculates the priority coefficient by use of at least one of an advance direction and a speed of said movable body.

17. A program storage device according to claim 15, wherein, in case that said movable body is traveling on a highway road, said calculation process gives the degree of priority to said extracted one of said reach targets such that, as said extracted one of said reach targets is located the closer to an interchange to exit thereat from said highway road, the degree of priority becomes the higher.

18. A program storage device according to claim 15, wherein said calculation process calculates the priority coefficient by use of at least one of a road width, a road distance and a road inclination of a route where said movable body is to travel.

19. A program storage device according to claim 15, wherein said display process selects said N reach targets in an order from the higher degree of priority on the basis of the calculated priority coefficient, and displays said selected N reach targets simultaneously on a map.

20. A program storage device according to claim 15, wherein said calculation process gives the degree of priority to said extracted M reach targets in correspondence with a road, on which said movable body is travelling, as the moving condition of said movable body.

21. A program storage device according to claim 15, wherein said calculation process gives the degree of priority to said extracted M reach targets in correspondence with a current position of said movable body, as the moving condition of said movable body.

* * * * *

UNITED STATES PATENT AND TRADEMARK OFFICE
CERTIFICATE OF CORRECTION

PATENT NO. : 6,070,122
DATED : May 30, 2000
INVENTOR(S) : Akira ISHIDA et al.

It is certified that error appears in the above-indentified patent and that said Letters Patent is hereby corrected as shown below:

Col. 13, line 13, after "movable" insert --body is to reach;--.

Signed and Sealed this

Seventeenth Day of April, 2001

*Attest:*

NICHOLAS P. GODICI

*Attesting Officer*     *Acting Director of the United States Patent and Trademark Office*